March 10, 1970 R. W. ECKSTEIN, JR 3,500,172
HIGH VOLTAGE, HIGH POWER SERIES REGULATOR
Filed June 21, 1967
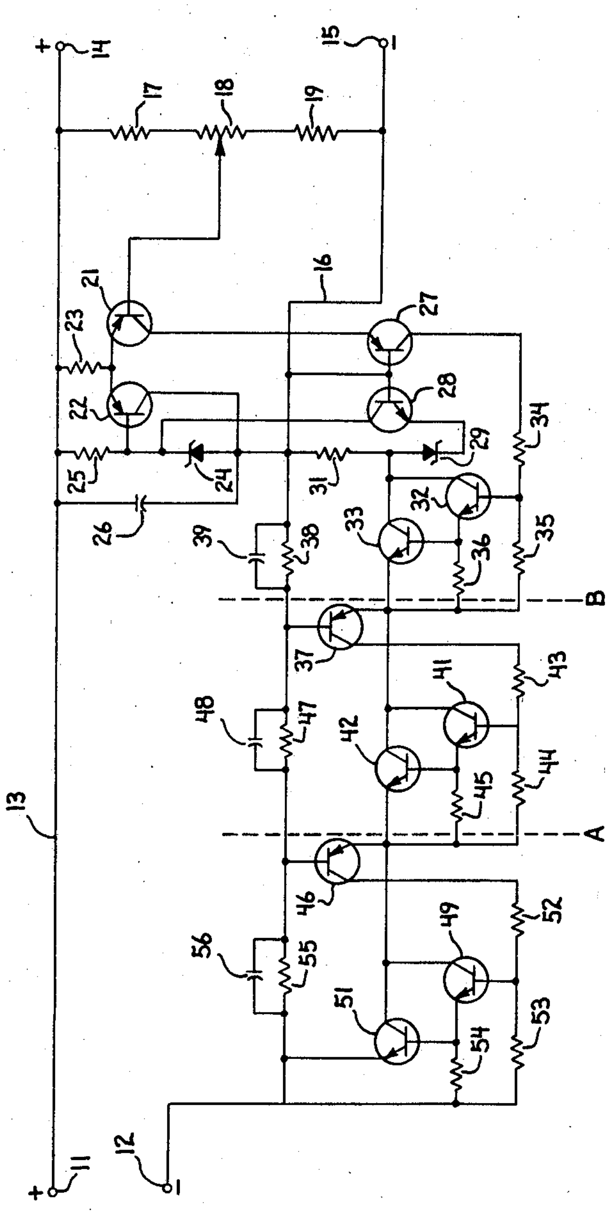
INVENTOR.
ROYAL W. ECKSTEIN, JR.
BY
H. H. Losche
Attorney

United States Patent Office 3,500,172
Patented Mar. 10, 1970

3,500,172

HIGH VOLTAGE, HIGH POWER SERIES REGULATOR

Royal W. Eckstein, Jr., Indianapolis, Ind., assignor to the United States of America as represented by the Secretary of the Navy Filed June 21, 1967, Ser. No. 648,535
Int. Cl. G05f *1/10*
U.S. Cl. 323—9 4 Claims

ABSTRACT OF THE DISCLOSURE

A high voltage, high power solid-state regulator circuit, having a Zener referenced differential amplifier for sensing load requirements and providing an error signal to a common-base amplifier. This common-base amplifier is coupled to a first pair of transistors arranged in a Darlington configuration which are, in turn, coupled to a plurality of load sharing regulating sections, each section including a pair of transistors in a Darlington configuration coupled to a third transistor which acts as an error sensor and D.C. amplifier. These load sharing regulating sections are coupled to one another and to a resistive divider network in such manner that the error sensing third transistor within each section causes its associated Darlington pair to assume its proportionate share of the load; a small current through the resistive divider network controls the divsion of voltages between the load sharing sections, thereby increasing the standoff voltage capability of the overall regulator circuit and decreasing the power dissipation per load sharing section, in direct proportion to the number of such sections utilized.

BACKGROUND OF THE INVENTION

This invention is in the field of voltage magnitude control, and more specifically in the area of solid state automatic high voltage, high power regulator circuitry.

In the past vacuum tubes were used for high voltage series regulators, and when current ratings higher than those of individual tubes were required, tubes were coupled in parallel or larger tubes were employed. Later transistors were utilized in regulators and were paralled for higher power rating or, if utilized in series, they were individually controlled by a D.C. control voltage from an amplifier. Vacuum tubes require heater power, have poor saturation characteristics, and have a relatively high volume requirement. Parallel transistors require special circuitry to control current sharing and are limited in applied voltage to the breakdown rating of the individual transistors, and series transistors controlled by a D.C. amplifier require a relatively large power dissipation in the amplifier.

SUMMARY OF THE INVENTION

In the present invention a Zener referenced differential amplifier is coupled across a load for sensing its requirement and providing an error signal to a common-base amplifier which is coupled to a first pair of transistors arranged in a Darlington configurtion which are, in turn, coupled to a plurality of load sharing regulating sections. Each of these sections includes a pair of transistors, one being a power transistor, arranged in a Darlington configuration and coupled to a third transistor which provides error sensing and D.C. amplification for that section. These load sharing regulating sections are coupled to one another and to a resistive divider network comprised of a plurality of equal resistances. The third, or error sensing, transistor within each section is coupled to a respective junction point of the divider network and to its associated Darlington pair of transistors in such a manner that the power transistor therein is caused to assume its proportionate share of the load. This arrangement of load sharing sections enables a small current through the resistive divider network to insure the equal division of voltage among the plurality of load sharing sections. Increasing the number of load sharing sections utilized increases the standoff voltage capability of the overall regulator circuit and decreases the power dissipation per load sharing section, in direct proportion to the number of such sections utilized. The novel sharing regulating circuitry of this invention enables presently available transistors to be utilized in the construction of high voltage, high power regulators. In such regulators of the prior art, it has been necessary to utilize vacuum tubes or to employ relatively cmplex amplifying control circuitry in conjunction with transistors because of the relatively low voltage standoff and current ratings of presently available transistors.

It is a general object of this invention to provide a reliable solid state high voltage, high power regulator utlizing presently available transistors in a plurality of novel load sharing sections, and having a minimum number of components.

BRIEF DESCRIPTION OF THE DRAWING

These and other objects and the attendant advantages, features, and uses will become more apparent to those skilled in the art as the description proceeds when taken in consideration of the accompanying drawing, in which there is shown a schematic diagram of the invention.

DESCRIPTION OF THE PREFERRED EMBODIMENT

Referring more particularly to the figure of drawing, there is shown a schematic diagram of the invention in which a pair of input terminals 11 and 12 are provided for coupling to a source of high voltage direct current potential. Positive input terminal 11 is coupled via a conductor 13 to positive output or load terminal 14. Output terminal 14 is coupled to negative output or load terminal 15 by a resistive sensing network comprised of fixed resistances 17 and 19, and a potentiometer 18 which provides adjustment of the output voltage. The movable contact of potentiometer 18 is coupled to the base electrode of a transistor 21 which has its emitter electrode coupled in common with the emitter electrode of a transistor 22 and, via a resistance 23, to positive conductor 13. Transistors 21 and 22 form a differential amplifier which is Zener referenced by a Zener diode 24. The collector electrode of transistor 22 is coupled to the anode electrode of Zener diode 24, and the base electrode thereof is coupled to the cathode electrode of diode 24. Diode 24 is further coupled via a resistance 25 to positive conductor 13. A filter capacitance 26 has one terminal coupled to the anode electrode of Zener diode 24 which junction is further coupled to a negative conductor 16, and the other terminal coupled to conductor 13. Transistor 21 has its collector electrode coupled to the emitter electrode of a transistor 27, which has its base electrode coupled, in common with the base electrode of a transistor 28, to conductor 16. The collector electrode of transistor 28 is coupled to the junction of resistance 25, the base electrode of transistor 22, and the cathode electrode of Zener diode 24. Transistor 28 has its emitter electrode coupled to the cathode electrode of a Zener diode 29, which has its anode electrode coupled to the collector electrodes of transistors 32 and 33, and also via a resistance 31 to conductor 16. Transistor 28, Zener diode 29, and resistance 31 form a current limiting protection circuit which causes the flow of current to the load to be cut off in case of a short circuit across terminals 14 and 15.

Transistor 27 has its collector electrode coupled via a resistance 34 to the base electrode of transistor 32, which has its emitter electrode coupled to the base electrode of transistor 33. The base electrodes of transistors 32 and 33 are coupled via resistances 35 and 36 respectively, to a junction of the emitter electrodes of transistors 33 and 37. A resistance 38 is coupled, in parallel with a capacitance 39, between the base electrode of transistor 37 and the junction of resistance 31, conductor 16, and diode 24. The junction of the emitter electrodes of transistor 33 and 37 is coupled to the common collector electrodes of transistors 41 and 42. The collector electrode of transistor 37 is coupled via a resistance 43 to the base electrode of transistor 41, which has its emitter electrode coupled to the base electrode of transistor 42. The base electrodes of transistors 41 and 42 are coupled via resistances 44 and 45, respectively, to a junction of the emitter electrodes of transistors 42 and 46. A resistance 47, in parallel with a capacitance 48, is coupled between the base electrode of transistor 46 and the junction of transistor 37, resistance 38, and capacitance 39. The junction of the emitter electrodes of transistors 42 and 46 is coupled to the common collector electrodes of transistors 49 and 51. The base electrode of transistor 49 is coupled via a resistance 52 to the collector electrode of transistor 46, and via a resistance 53 to negative input terminal 12. The base electrode of transistor 51 is coupled directly to the emitter electrode of transistor 49, and via a resistance 54 to negative input terminal 12. A resistance 55, in parallel with a capacitance 56, is coupled between negative input terminal 12, and the junction of transistor 46, resistance 47, and capacitance 48. The emitter electrode of transistor 51 is coupled directly to input terminal 12.

The circuitry between the vertical broken lines A and B in the figure of drawing, comprised of error sensing and amplifying transistor 37, Darlington coupled transistors 41 and 42, resistances 43, 44, and 45, stabilizing capacitance 48, and voltage dividing resistance 47, represents a typical load sharing section of the present invention. The identical circuitry to the left of broken line A represents a second load sharing section. A high voltage regulator may incorporate as many of these novel load sharing sections as is necessary in order to remain within the voltage breakdown and current carrying ratings of the available power transistors to be utilized therein.

For convenience in specifically describing one operating example of the invention, the following Table I lists various elements and components shown in the figure of drawing, with suitable values and types therefor. While this example of a working embodiment is provided herein, it is to be understood that these elements, components, and values are in no way to limit the invention thereto, as other values and other components of a like nature may be utilized to accomplish similar results.

TABLE I

| | |
|---|---|
| Transistors 21 and 22 | 2N4036 |
| Transistors 27, 37, and 46 | 2N3634 |
| Transistor 28 | 2N2102 |
| Transistors 32, 41, and 49 | 2N3441 |
| Transistors 33, 42, and 51 | 2N3773 |
| Diode 24 | 1N937A |
| Diode 29 | 1N748A |
| Resistance 17 | 35,000Ω |
| Potentiometer 18 | 500Ω |
| Resistance 19 | 825Ω |
| Resistance 23 | 20,000Ω |
| Resistance 25 | 100,000Ω |
| Resistance 31 | 2.5Ω |
| Resistances 34, 43, and 52 | 1,000Ω |
| Resistances 35, 44, and 53 | 2,000Ω |
| Resistances 36, 45, and 54 | 100Ω |
| Resistances 38, 47, and 55 | 10,000Ω |
| Capacitance 26 μf | 10 |
| Capacitances 39, 48, and 56 μμf | 6,800 |

Input Voltage at terminals 11 and 12 360 v. D.C. unregulated Output Voltage at terminals 14 and 15 300 v. D.C. regulated Operation For purposes of explanation of the operation of the invention as shown in the figure of drawing, it will be assumed that an unregulated high voltage source of direct current potential, for example, 360 volts D.C., is coupled to input terminals 11 and 12 with the polarity shown, a load is coupled across output terminals 14 and 15, and the output voltage is to be regulated to 300 volts D.C. Initially, with a normal load coupled across output terminals 14 and 15, potentiometer 18 should be adjusted to provide the desired 300 volts D.C. across the load as indicated on any suitable voltmeter coupled across the output terminals. The primary flow of conventional load current is from the unregulated source into positive input terminal 11, via conductor 13 to output terminal 14, through the load, into negative output terminal 15, via conductor 16 and resistance 31, through power transistors 33, 42, and 51 to negative input terminal 12, and back to the source.

Having adjusted potentiometer 18, it will be assumed for purposes of describing the operation of the invention, that the D.C. potential applied to input terminals 11 and 12 by the unregulated source coupled thereto suddenly drops, for example, from 360 volts D.C. to 340 volts D.C., causing the load voltage across output terminals 14 and 15 to decrease. This decrease in potential across output terminals 14 and 15 will cause a decrease in the small sensing current flowing through the output sensing network comprised of resistance 17, potentiometer 18, and resistance 19. The decrease in current flow through the fixed resistance portion of potentiometer 18 will be reflected, via its movable contact arm, at the base electrode of PNP differential amplifier transistor 21 as a decrease in potential, thereby unbalancing the differential amplifier, which is referenced by Zener diode 24 coupled via resistance 25 across output terminals 14 and 15, and increasing the conduction of transistor 21, which increases the current flow through common base amplifier transistor 27. This increased current flow through transistor 27 increases the potential at the base electrode of NPN transistor 32 via resistance 34, causing it to increase conduction thereby raising the potential at the base of Darlington coupled NPN power transistor 33, causing it to increase conduction of load current, thereby raising the potential at its emitter electrode. This increase in potential at the emitter electrode of transistor 33 raises the potential at the common coupled emitter electrode of PNP error sensing amplifier transistor 37 (in the first load sharing section, located between broken lines A and B in the figure of drawing), which controls the conduction of Darlington coupled transistors 41 and 42. The base electrode of transistor 37 is maintained at the junction potential of resistances 38 and 47 by a small control current which flows through the resistive divider network comprised of equal resistances 38, 47, and 55, and the increase in potential at its emitter electrode causes transistor 37 to increase conduction, thereby raising the potential at he base electrode of NPN transistor 41, via resistance 43, and causing it to increase conduction. This increase in conduction of transistor 41 causes a rise in potential at the base electrode of Darlington coupled NPN power transistor 42, causing it to increase conduction and assume its proportionate share of the load current while raising the potential at its emitter electrode.

This rise in potential at the emitter electrode of power transistor 42 causes a rise in potential at the emitter electrode of PNP error sensing amplifier transistor 46, which controls Darlington coupled transistors 49 and 51. The base electrode of transistor 46 is maintained at the junction potential of divider network resistances 47 and 55 by the small control current flowing through the resistive divider network of equal resistances 38, 47, and 55. The increase in potential at its emitter electrode causes transistor 46 to increase conduction, causing a rise in potential at the base electrode of NPN transistor 49, via resistance 52, thereby causing it to increase conduction. This increase in conduction of transistor 49 causes a rise in potential at the base electrode of Darlington coupled NPN power transistor 51, causing it to increase conduction and assume its proportionate share of the load current.

These proportionate increases in the level of conduction through the primary regulating power transistor 33 and each of the load sharing power transistors 42 and 51 will continue until the potential across the load, as sensed by the small current flow through the output sensing network of potentiometer 18 and resistances 17 and 19, has risen to the desired regulated value of 300 volts D.C., causing the potential at the base of differential amplifier transistor 21 to rise to a level which balances the differential amplifier and stabilizes the level of conduction through transistors 21 and 27. This stabilization of conduction through transistors 21 and 27 causes the potential at the base electrode of transistor 32 to be maintained at its present value, thereby stabilizing the level of conduction through transistor 32. This causes the potential at the base electrode of Darlington coupled power transistor 33 to be maintained at its present value, stabilizing the level of conduction therethrough and maintaining the potential at its emitter electrode at its present value. The potential at the emitter elecrode of error sensing amplifier transistor 37 in the first load sharing section is thereby held at its present level, causing it, via transistor 41, to stabilize its associated power transistor 42 at the same level of conduction as that of power transistor 33. In response to this stabilized level of conduction through power transistor 42, the emitter-coupled error sensing amplifier transistor 46 in the second load sharing section maintains its present level of conduction and, in turn, controls power transistor 51, via transistor 49, causing it to become stabilized at the same level of conduction as that of power transistors 33 and 42. The conduction through power transistors 33, 42, and 51 will remain at this level until another change occurs in the unregulated potential applied to input terminals 11 and 12, or until a change occurs in the load coupled across output terminals 14 and 15. Either, or both, of these changes will be sensed via potentiometer 18 as an unbalancing of the differential amplifier, causing transistor 21 to initiate a readjustment of the levels of conduction of power transistors 33, 42, and 51, in the manner previously explained, in order to maintain the desired 300 volts D.C. regulated potential across output terminals 14 and 15.

Overload and short circuit protection are provided by a current limiting circuit comprised of transistor 28, Zener diode 29, and resistance 31. Under an overload or short circuit condition, the current flow through resistance 31 will increase rapidly until it reaches the level at which the voltage drop across resistance 31 ($I_{31} \times R_{31}$) exceeds the breakdown voltage of Zener diode 29 and the $V_{BE}$ of transistor 28, at which time normally nonconducting transistor 28 will conduct. This conduction through transistor 28 causes the reference potential at the cathode of Zener diode 24 and at the base electrode of differential amplifier transistor 22 to be considerably reduced, thereby increasing conduction through transistor 22 which, in turn, decreases conduction through differential amplifier transistor 21 causing it, via transistor 27, to regulate the output voltage to zero by ceasing, for all practical purposes, conduction through the regulator. When the short is removed, transistor 28 will cease to conduct and the regulator will return to normal operation.

In the shorted condition the output voltage is regulated to zero volts and no current flows between the output terminals. Thus it may be seen that if neither of the load sharing sections were utilized in the regulator, transistors 27, 32, and 33 would be required to withstand the entire unregulated input voltage applied to terminals 11 and 12. If this voltage is 360 volts D.C., PNP transistor 27 would be unavailable commercially at the present time, as such transistors are not available with breakdown voltages in excess of 150 volts. In addition, under normal load conditions, with an unregulated input potential of 360 volts. D.C. and a desired regulated output potential of 200 volts D.C., as adjusted by potentiometer 18, a load current of one ampere would produce a power dissipation in transistor 33 of 160 watts, $(V_{in} - V_{out}) \times I_{load} = (360\ v. - 200\ v.) \times 1$ ampere=160 watts, an impractically high power dissipation even if secondary voltage breakdown were not a problem. By utilizing one or more of the novel load sharing sections (two shown in the figure of drawing) in conjunction with the basic regulator section, the load is shared equally between the basic section and each of the load sharing sections. Thus it may be seen, in view of the foregoing explanation and figure of drawing that the invention, a high voltage, high power series regulator is a very useful and versatile device in which the standoff voltage capability of the overall regulator circuit may be increased and the power dissipation per section decreased, in direct proportion to the number of novel load sharing sections utilized therein.

Many modifications and changes may be made by utilizing a lesser or greater number of load sharing sections, by replacing certain elements and components with equivalent structures, or by changing component values for particular applications.

The invention described herein may be manufactured and used by or for the Government of the United States of America for governmental purposes without the payment of any royalties thereon or therefor.

I claim:

1. A solid state automatic high voltage, high power series regulator comprising:

input means for coupling to a source of unregulated direct current potential;

output means for providing a regulated direct current potential to a load;

output sensing means coupled across said output means for sensing changes in the load and output potential and providing a sensing potential indicative of said changes;

amplifying control means coupled to said output sensing means for receiving said sensing potential and providing an amplified regulating control potential;

basic regulating means coupled to said output means, and also coupled to said amplifying control means for receiving said amplified regulating control potential and regulating said output potential in response thereto;

load sharing regulating means coupled in series with said basic regulating means between said input means and said output means including at least one load sharing section, each such section having a pair of regulating transistors coupled in Darlington configuration in series with the flow of load current through said section and having an error sensing and amplifying control transistor, for increasing the stand-off voltage capability of the overall regulator and for decreasing the power dissipation of said basic regulating means by sharing the regulating load therewith;

resistive voltage dividing means coupled between said input means and said output means, and also coupled to the base electrode of said error sensing and amplifying transistor for providing a load sharing control potential thereto, said error sensing and amplifying transistor having its emitter electrode coupled to the common collector junction of said pair of regulating transistors for sensing the level of load current flow through said load sharing section, and having its collector electrode coupled to said pair of regulating transistors, for controlling said pair of regulating transistors to cause their operation at a level of conduction which will insure equitable distribution of the regulating load among said basic regulating means and said load sharing means; and current limiting protection means coupled between said basic regulating means and said output means for sensing the magnitude of the current flow through said regulator, and also coupled to said amplifying control means for providing a current limiting control potential thereto, causing said amplifying control means to cease conduction of load current through the regulator when the magnitude of the sensed current exceeds a preset maximum level.

2. A solid state automatic high voltage, high power series regulator as set forth in claim 1, wherein said amplifying control means includes first and second transistor means coupled in a differential amplifying configuration, with said first transistor means having its base electrode coupled to a Zener reference diode which provides a reference potential for said amplifying control means and to said current limiting protection means for receiving said current limiting control potential therefrom; and said output sensing means includes a potentiometer having its fixed resistance portion coupled 2 across said output means and its movable contact coupled to the base electrode of said second transistor means for providing said sensing potential thereto.

3. A solid state automatic high voltage, high power series regulator as set forth in claim 2 wherein said resistive voltage dividing means comprises a plurality of resistances of equal value coupled in series between said input means and said output means, said plurality being equal in number to one more than the number of load sharing sections utilized in said regulator, each of said load sharing sections having said base electrode of said error sensing and amplifying control transistor therein coupled to a respective junction of said plurality of resistances for receiving said load sharing control potentials therefrom.

4. A solid state automatic high voltage, high power series regulator as set forth in claim 3 wherein said current limiting protection means comprises:

a current sensing resistance means coupled in series between said basic regulating means and said output means for sensing the magnitude of the current flow through said regulator, a Zener diode having its anode electrode coupled to the junction of said current sensing resistance means and said basic regulating means, and a transistor means coupled between the cathode electrode of said Zener diode and said base electrode of said first transistor means of said amplifying control means, said Zener diode breaking down and causing said transistor means to conduct and provide said current limiting control potential to said amplifying control means when the magnitude of the current through said current sensing resistance means exceeds a preset maximum level.

References Cited

UNITED STATES PATENTS

| | | |
|---|---|---|
| 3,160,807 | 12/1964 | Packard. |
| 3,174,093 | 3/1965 | Finkelstein. |
| 3,182,246 | 5/1965 | Lloyd. |
| 3,150,310 | 9/1964 | Ault. |
| 3,158,801 | 4/1961 | Tighe et al. |
| 3,192,467 | 6/1965 | Baracket. |

JAMES D. TRAMMELL, Primary Examiner

A. D. PELLINEN, Assistant Examiner

U.S. Cl. X.R.

323—22, 38